United States Patent
Horii et al.

(10) Patent No.: US 7,559,393 B2
(45) Date of Patent: Jul. 14, 2009

(54) EXHAUST STRUCTURE FOR FUEL CELL VEHICLES

(75) Inventors: Yoshiyuki Horii, Saitama (JP); Junya Watanabe, Saitama (JP); Masahiro Shimizu, Saitama (JP); Hiroyuki Kikuchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 587 days.

(21) Appl. No.: 11/139,621

(22) Filed: May 31, 2005

(65) Prior Publication Data

US 2006/0037793 A1 Feb. 23, 2006

(30) Foreign Application Priority Data

Aug. 19, 2004 (JP) ............................. 2004-239416

(51) Int. Cl.
*B60K 13/06* (2006.01)
*B60K 6/32* (2006.01)

(52) U.S. Cl. ................ 180/89.2; 180/65.22; 180/65.21; 903/908; 903/944

(58) Field of Classification Search ................ 180/65.1, 180/65.2, 89.2, 309, 903, 908, 944; 903/908, 903/944
See application file for complete search history.

(56) References Cited

U.S. PATENT DOCUMENTS

| | | | | | |
|---|---|---|---|---|---|
| 3,163,251 A | * | 12/1964 | Rees | ........................... | 180/309 |
| 3,763,950 A | * | 10/1973 | Rockwell | ..................... | 180/309 |
| 4,354,349 A | * | 10/1982 | Otani et al. | .................... | 60/299 |
| 4,995,471 A | * | 2/1991 | Hara et al. | ................... | 180/219 |
| 5,016,725 A | * | 5/1991 | Muramatsu | ................. | 180/225 |
| 6,158,543 A | * | 12/2000 | Matsuto et al. | ............. | 180/220 |
| 6,336,321 B1 | * | 1/2002 | Sagara et al. | ................. | 60/324 |
| 6,679,345 B2 | * | 1/2004 | Hirayama et al. | ........... | 180/65.3 |
| 6,695,089 B2 | * | 2/2004 | Adachi et al. | ................ | 180/311 |
| 6,962,225 B2 | * | 11/2005 | Conte | ......................... | 180/68.3 |
| 6,968,915 B2 | * | 11/2005 | Takagi et al. | ................ | 180/65.3 |
| 2002/0005305 A1 | * | 1/2002 | Hirayama et al. | ........... | 180/68.5 |
| 2002/0162693 A1 | * | 11/2002 | Mizuno et al. | .............. | 180/65.1 |

(Continued)

FOREIGN PATENT DOCUMENTS

JP 2001-313056 A 11/2001

(Continued)

*Primary Examiner*—Christopher P Ellis
*Assistant Examiner*—Jacob Meyer
(74) *Attorney, Agent, or Firm*—Birch, Stewart, Kolasch & Birch, LLP

(57) ABSTRACT

An exhaust structure for a fuel cell vehicle includes a fuel cell for generating electrical power by inducing a reaction between hydrogen and oxygen and, a motor to generate motive power for supply to the rear wheel functioning as the drive wheel based on the electrical power generated by the fuel cell and, an exhaust pipe to convey byproducts in the fuel cell power generation process and, an exhaust port formed on the exhaust pipe opening towards the outer side of the vehicle frame, wherein the exhaust port is positioned more to the rear with respect to the front end of the rear wheel, and more specifically is formed further to the rear with respect to the rear wheel drive shaft. The exhaust structure so configured for fuel cell vehicles is capable of preventing byproducts from the fuel cell from reaching the drive wheel, even when struck by the wind, or when changing the turn radius.

14 Claims, 6 Drawing Sheets

U.S. PATENT DOCUMENTS

| | | | |
|---|---|---|---|
| 2003/0037983 A1 | 2/2003 | Hanaya et al. | |
| 2003/0068543 A1* | 4/2003 | Yasuo et al. | 429/38 |
| 2003/0155160 A1* | 8/2003 | Nomura et al. | 180/65.1 |
| 2004/0129482 A1* | 7/2004 | Takenaka et al. | 180/309 |
| 2005/0211488 A1* | 9/2005 | Gore et al. | 180/219 |
| 2005/0224273 A1* | 10/2005 | Conte | 180/309 |
| 2006/0037793 A1* | 2/2006 | Horii et al. | 180/89.2 |
| 2007/0181360 A1* | 8/2007 | Nakayama | 180/309 |

FOREIGN PATENT DOCUMENTS

JP        2003-291657 A        10/2003

\* cited by examiner

EXHAUST STRUCTURE FOR FUEL CELL VEHICLES

CROSS-REFERENCE TO RELATED APPLICATION

The present application claims priority under 35 U.S.C. § 119 to Japanese Patent Application No. 2004-239416, filed Aug. 19, 2004, the entire contents of which are hereby incorporated by reference.

BACKGROUND OF THE INVENTION

1. Field of the Invention

The present invention relates to an exhaust structure for discharging reacted gas from the fuel cell in fuel cell vehicles.

2. Description of Background Art

In fuel cell vehicles of the background art utilizing a drive motor based on power supplied from a fuel cell, an exhaust port is positioned forward of the drive wheel and open on the outer side of the vehicle frame to prevent byproducts such as water discharged from the fuel cell from reaching the drive wheel. (See for example, JP-A No. 313056/2001.)

However, the fuel cell system also normally requires an exhaust port for discharging the reacted gas from the fuel cell. A slight amount of waste water due to condensing of water vapor contained in the exhaust gas is discharged from the exhaust port. In the exhaust port of the known art, byproducts from the exhaust port can be prevented from reaching the drive wheel when (the motorcycle is) moving straight ahead with no breeze, or when making a normal turn. However, when a side wind is blowing, or when the vehicle turn radius is changing, these byproducts might reach the drive wheel.

In view of the above problem, the present invention provides an exhaust structure yet further capable of preventing byproducts from the fuel cell from reaching the drive wheel, even if struck by the wind or the turning radius changes.

SUMMARY AND OBJECTS OF THE INVENTION

As a means to solve the above described problems, a first aspect of the present invention provides an exhaust structure for a fuel cell vehicle including a fuel cell (for example, the fuel cell 51 of the embodiment) for generating electrical power by inducing a reaction between hydrogen and oxygen and, a motor (for example, a motor 31 of the embodiment) to generate motive power for supply to the drive wheel (for example, the rear wheel 32 of the embodiment) based on the electrical power generated by the fuel cell and, an exhaust pipe (for example an exhaust pipe 77 of the embodiment) to convey byproducts in the fuel cell power generation process and, an exhaust port (for example, an exhaust port 76 of the embodiment) formed in the exhaust pipe and open towards the outer side of the vehicle frame, and characterized in that the exhaust port is positioned more to the rear than the front end of the drive wheel.

This structure to a great extent prevents byproducts (for example, water vapor) from the fuel cell from reaching the drive wheel even when a side wind blows or the turning radius changes.

According to a second aspect of the present invention, the exhaust port is preferably installed further to the rear than the drive wheel shaft, so that it will be difficult for byproducts from the fuel cell to reach the drive wheel.

According to a third aspect of the present invention, by installing the exhaust pipe at an angle which rises above an upper side of the drive wheel the more the exhaust pipe is to the rear, that it will be even more difficult for byproducts from the fuel cell to reach the drive wheel.

According to a fourth aspect of the present invention, installing the exhaust pipe upward with respect to the drive wheel allows the byproducts from the fuel cell to be easily dispersed by the wind (air pressure) from the moving vehicle.

According to a fifth aspect of the present invention, the fuel cell vehicle is a motorcycle and includes a side stand (for example a side stand 38 of the embodiment) for supporting the frame on one side, and the exhaust port is installed on the side where the side stand is installed.

This structure allows byproducts from the exhaust port to easily drain away even when the fuel cell vehicle is parked.

According to the first through fourth aspects of the present invention, byproducts from the fuel cell can be prevented from reaching the drive wheel, even when there is a wind, or when the vehicle turn radius is changing.

According to the fifth aspect of the present invention, the discharge of byproducts is improved when the vehicle is parked.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiment of this invention is described next while referring to the accompanying drawings. There are no particular restrictions on the front/rear/left/right orientation in the following description and these are identical to the vehicle orientation unless described otherwise. The FR arrow in the figure indicates the forward direction of the vehicle. The LH arrow indicates the left of the vehicle. The arrow UP indicates the direction above the vehicle.

Figure 1:
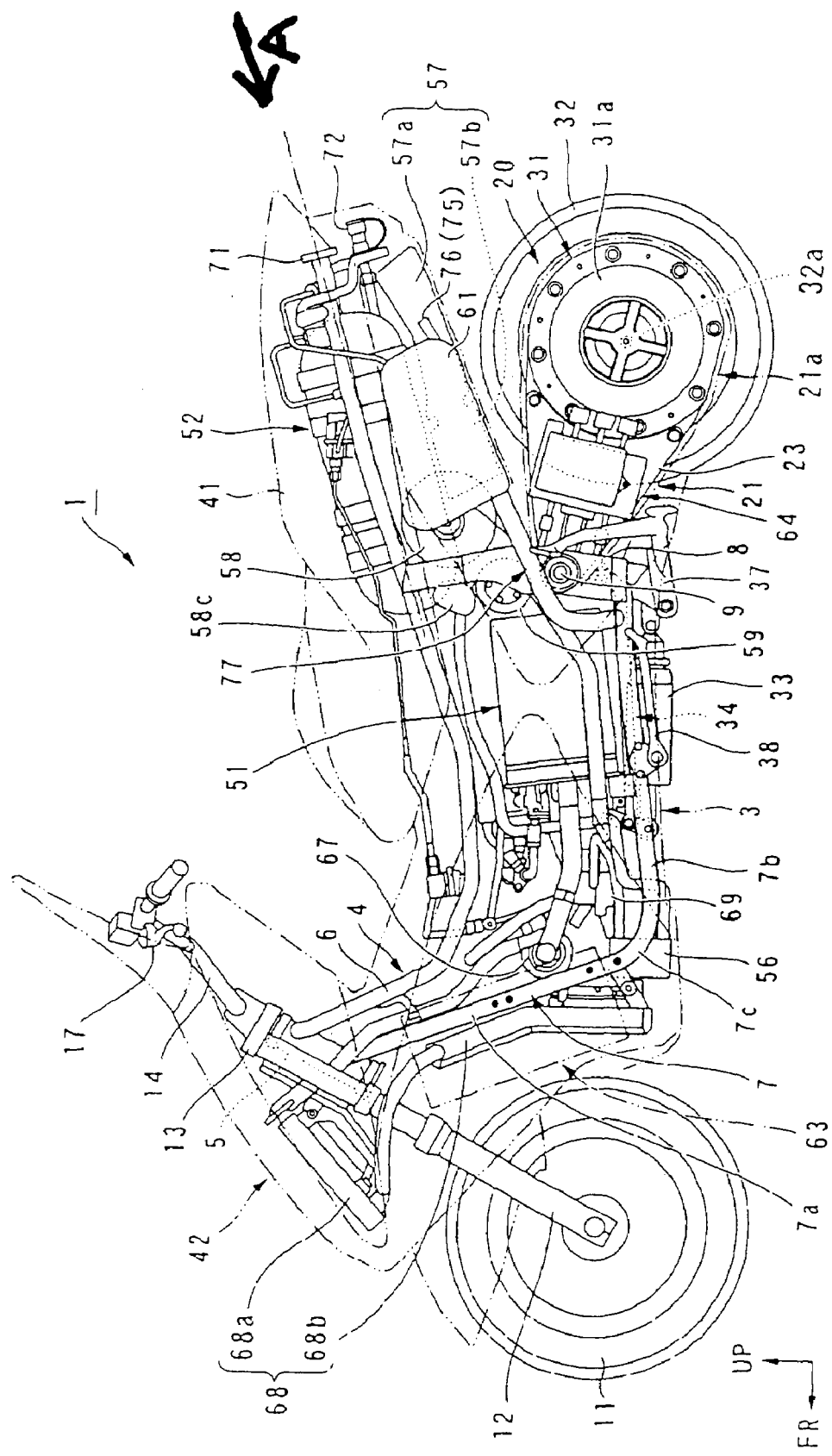
FIG. 1 is a drawing showing the left side of the fuel cell vehicle (motorcycle) of the embodiment of this invention.
Figure 2:
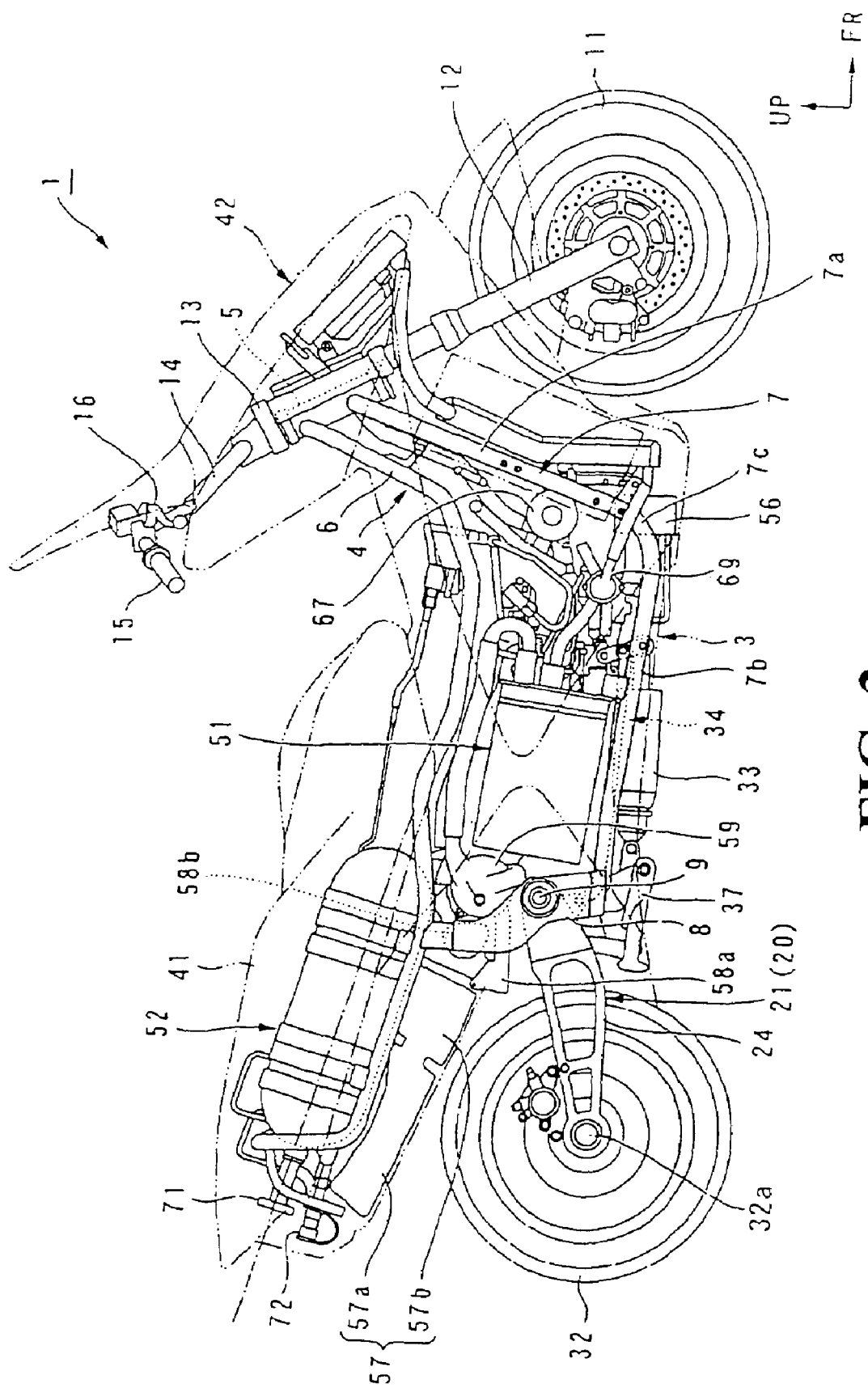
FIG. 2 is a drawing showing the right side of the fuel cell vehicle.
Figure 3:
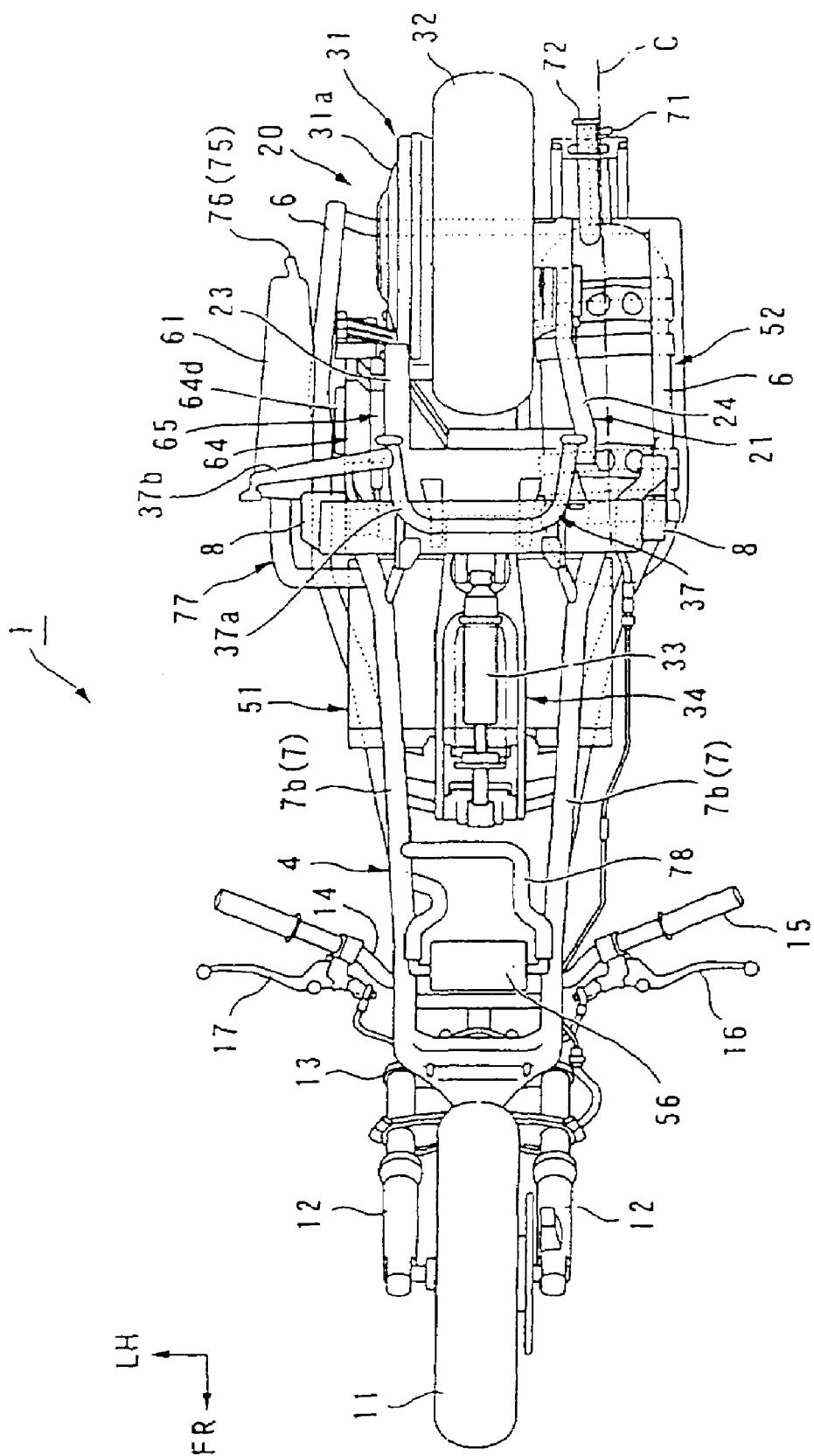
FIG. 3 is a drawing showing a bottom view of the fuel cell vehicle.

The motorcycle 1 shown in FIG. 1 through FIG. 3 includes a fuel cell vehicle driven by a vehicular drive motor 31 based on electrical power supplied from a fuel cell 51 mounted in the center of that vehicle frame. The motorcycle 1 may also be a scooter type vehicle including a low floor (hereafter, called simply, floor section) 3. A fuel cell 51 comprised of a rectangular parallelepiped is installed in the vicinity of the floor section 3. Moreover, a motor 31 functioning as a so-called wheel-in-motor is installed in the interior of the rear wheel 32 serving as the rear wheel of the motorcycle 1. The motor 31 is made up of an integrated unit including a speed reducer and motor unit within the casing 31a. The output shaft of the motor is installed in the wheel for example from the left side in a state concentric with the rear wheel shaft 32a.

The front wheel 11 of the motorcycle 1 is axially supported on the bottom end of the left/right pair of front forks 12. The upper section of each of these front forks 12 is supported on the head pipe 5 at the front end of the vehicle frame 4 to allow steering via the steering stem 13. A handle 14 is installed on the upper end of the steering stem 13. A throttle grip 15 is installed on the right grip section of this handle 14. The rear and front brake levers 16 and 17 are respectively installed forward of the left and right grip sections.

A pivot plate 8 extending upwards and downwards along the frame is installed on the rear section of the vehicle frame 4. The front end of the rear swing arm 21 is supported via the pivot shaft 9 at a section slightly below the midsection of the pivot plate 8 so that the rear end side of the swing arm can swing upwards and downwards on the frame. The left arm 23 of the rear swing arm 21 extends to the front end of the motor 31 and supports the casing 31a of the motor 31. The right arm 24 on the other hand, extends to the center position on the rear wheel 32 and supports the rear wheel shaft 32a. The swing unit of the motorcycle 1 is comprised mainly by the rear swing arm 21 and the motor 31 in this way to form a motor unit 20.

A rear cushion 33 extending towards the front and rear of the frame is installed on the section below the fuel cell 51 in a section beneath the vehicle frame 4. The rear end of the rear cushion 33 is linked to the section below the vehicle frame 4, and the front end of the rear cushion 33 is linked to the section below the motor unit 20 (rear swing arm 21) via the link mechanism 34. The link mechanism 34 makes the rear cushion 33 perform a frontward-rearward stroke along with the upward and downward swing of the motor unit 20. The stroke made by the rear cushion 33 serves to absorb the impacts and vibrations input to the motor unit 20.

The vehicle frame 4 includes: an upper tube 6 branching to the left and right from the upper section of the head pipe 5 to extend sideways and downwards, and after bending at a height approximately midway in the vehicle upward and downward directions, extends toward the rear (of the frame); and a down tube 7 branching to left and right from a section below the head pipe 5 to extend sideways and downwards, and extend rearward after bending at the bottom end of the frame. The rear end of the upper tube 6 and the rear end of the down tube 7 are respectively joined at the upper end and bottom end of the pivot plate 8 positioned further to the rear than the fuel cell 51. The section on the down tube 7 from the head pipe 5 to the bend 7c on the bottom of the frame is hereafter called the front side 7a; and the section from the bend 7c to the pivot plate 8 is called the bottom side 7b.

Each upper tube 6 extends further rearward from the pivot plate 8 towards the rear end of the vehicle frame. The rear half sections of the upper tubes 6 are utilized as seat frames to support the rider seat 41.

The frame cover (cover member) 42 made mainly from synthetic resin, covers the motorcycle 1. This frame cover 42 also functions as a wind protector and moreover a portion of the frame cover 42 along with the vehicle frame 4 comprises the floor section 3. A main stand 37 is installed at the lower center of the vehicle frame 4 to support the vehicle in an upright position. A side stand 38 is installed on the lower left side of the vehicle frame 4 to support the left side of the vehicle in a slanted upright position.

Figure 4:
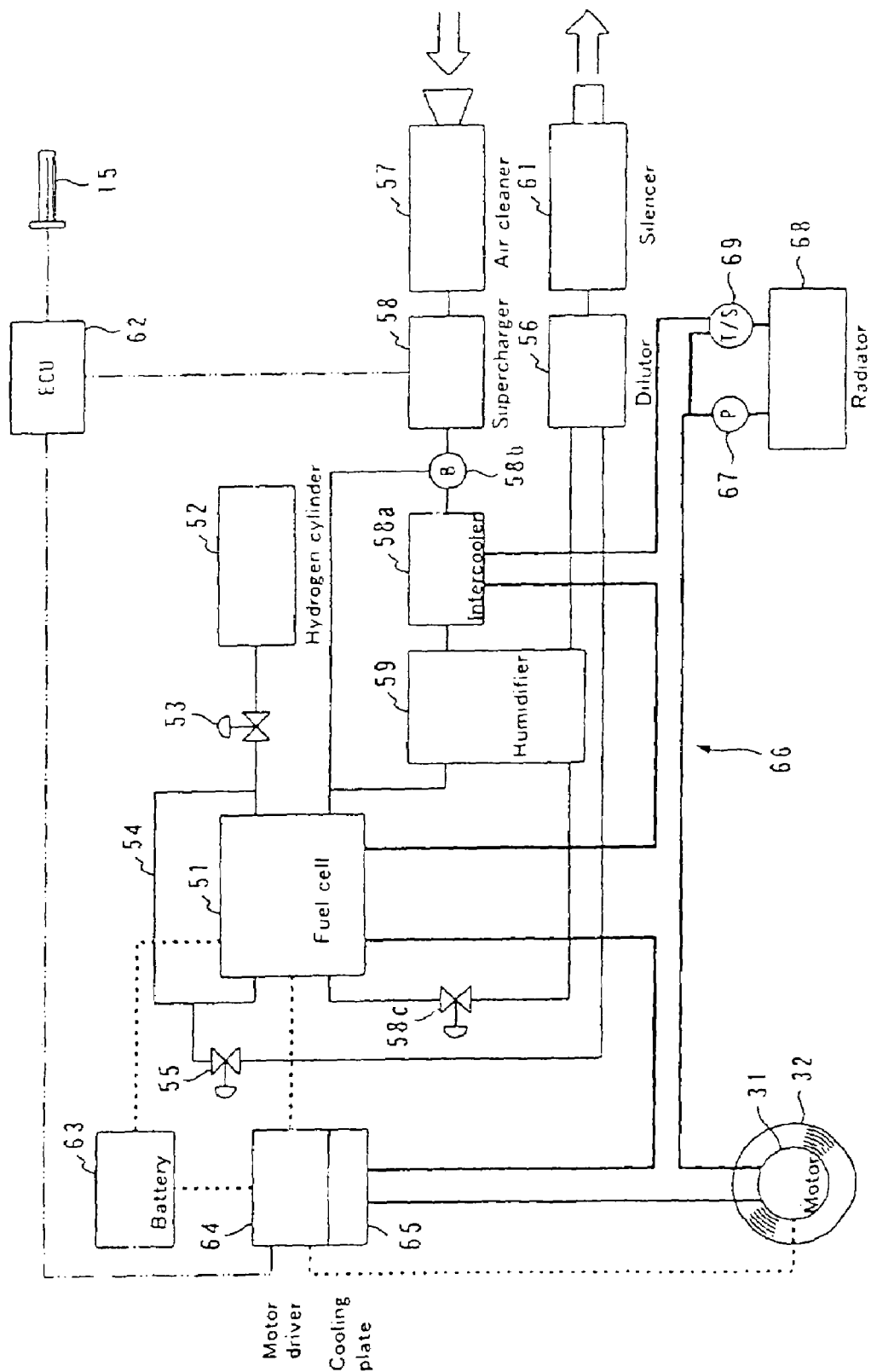
FIG. 4 is a drawing showing the main structure of the fuel cell system in the fuel cell vehicle.

The fuel cell system of the motorcycle 1 is briefly described while referring to FIG. 4.

The fuel cell 51 is a PEMFC (polymer electric membrane fuel cells) made up of multiple layers of single cells. Hydrogen gas is supplied as a gas fuel to the anode side (of the fuel cell) and air containing oxygen is supplied as an oxidizer gas to the cathode side in order to cause an electrochemical reaction that generates electricity, as well as generates water.

The hydrogen gas serving as the gas fuel is supplied at a specified pressure from the hydrogen cylinder 52 via a shutoff valve 53 to the fuel cell 51, and after generating electricity is also fed into the hydrogen circulating path 54. Hydrogen gas in this hydrogen circulating path 54 that has not undergone a chemical reaction is repeatedly supplied to the fuel cell 51 along with fresh hydrogen gas from the hydrogen cylinder 52. The hydrogen gas circulating in the hydrogen circulating path 54 can be supplied via the purge valve 55 to the diluter 56.

The air serving as the oxidizer gas on the other hand, is supplied via an air cleaner 57 into a supercharger 58 and then supplied at a specified pressure to the fuel cell 51. Moreover after being used to generate electricity, it is supplied to the diluter 56. The reference numeral 58a denotes an intercooler for cooling the air (oxidizer gas) supplied to the fuel cell 51. The reference numeral 59 denotes a humidifier for supplying moisture to the oxidizer gas. The reference numeral 58b denotes a bypass valve for supplying air without using the intercooler 58a and the humidifier 59 when the fuel cell 51 is at a low temperature, etc. The reference numeral 58c denotes a back-pressure valve for adjusting the pressure of the oxidizer gas to the fuel cell 51.

Then, opening the purge valve 55 installed in the hydrogen circulating path 54, supplies the gas from after the reaction (process) into the diluter 56. In the diluter 56, this gas mixes with the air expelled from the fuel cell 51, and after dilution, is discharged via the silencer 61 into the atmosphere. The generated water from the fuel cell 51 is accumulated here while fed along with the expelled air into the humidifier 59, and re-utilized as moisture for supply to the oxidizer gas. The moisture (for example, vapor) not accumulated in the humidifier 59 is expelled along with the reacted gas after passing through the diluter 56.

An ECU (electronic control unit) 62 controls the operation of the fuel cell 51. More specifically, signals relating to the pressure and temperature of the hydrogen gas and oxidizer gas, signals relating to the vehicle speed and rotation speed of the supercharger, and signals relating to the fuel cell 51 and its cooling water temperature are input to the ECU 62. The ECU 62 then controls the operation of the supercharger 58, the bypass valve 58b, the back-pressure valve 58c, the purge valve 55 and the cutoff valve 53 according to these signals.

The throttle grip 15 inputs an acceleration request signal to the ECU 62 and the drive motor 31 for the rear wheel 32 is then controlled by this signal. The direct current from the fuel cell 51 or the battery 63 functioning as a secondary battery is converted to three-phase alternating current in the motor driver 64 serving as the inverter unit, and is then supplied to the motor 31 comprised of a three-phase alternating current motor.

The cooling circuit for the fuel cell system includes a water jacket for the fuel cell 51 and motor 31, as well as a cooling water path 66 connecting to each water path inside the cooling plate (radiator) 65 adjoining the motor driver 64 and in the intercooler 58a; and a water pump 67 and radiator 68 installed in the cooling water path 66.

In this type of cooling circuit, the water pump 67 operates to make cooling water flow and circulate within the cooling water path 66, so that along with absorbing the heat from the fuel cell 51, the motor 31, the oxidizer gas and the motor driver 64, that heat is dissipated by the radiator 68. The reference numeral 69 denotes a thermostat for circulating cooling water during low temperature in the fuel cell 51 without using the radiator 68.

The following description is given while referring to FIG. 1 through FIG. 3. The hydrogen cylinder 52 is typically a high pressure gas tank with an external cylindrical contour and is generally multiple containers comprised of metal and reinforced plastic. The hydrogen cylinder 52 is installed on the right rear side of the frame, towards the front and rear along the axial line C with this axial line C lowering slightly towards the front of the vehicle. The right side end (outer side edge) of the hydrogen cylinder 52 is positioned slightly more to the outer side than the outer end of the upper tube 6 on the right side of the frame. Moreover, the left side end (left side edge) (of hydrogen cylinder 52) is positioned slightly more to the outer side than the outer side end of the rear wheel 32.

The front and rear ends of the hydrogen cylinder 52 are formed in a spherical shape (or tapering towards the end). The hydrogen cylinder is installed so that the front end is positioned to the front of the pivot plate 8 and the rear end is positioned at the rear end of the vehicle frame. The hydrogen fill inlet 72 and the source port 71 of the hydrogen cylinder 52 are installed on the rear end of the hydrogen cylinder 52.

The upper tube 6 on the left side of the vehicle frame extends roughly in a straight line rearward while tilted slightly upwards. The upper tube 6 on the right side of the vehicle on the other hand, in contrast to the upper tube 6 on the left side, is installed to gradually change downwards towards the lower side in the vicinity of the pivot plate 8. These upper tubes 6 are installed in this way to change slightly towards the outer side (width) of the vehicle in the vicinity of the pivot plate 8.

The upper tube 6 on the right side of the frame is installed so that the lower end nearly overlaps with the lower end of the hydrogen gas tank 51 as seen from the side of the frame. The upper tube 6 bends upward at the rear of the frame and extends toward the left side of the frame so as to avoid the source port 71 and hydrogen fill inlet 72 of the hydrogen cylinder 52, and then bends downward to connect to the rear end of the upper tube 6 on the left side of the frame.

The fuel cell 51 widens towards the sides of the vehicle and is flat (on the sides) facing upwards and downwards. A supply port and exhaust port for the oxidizer gas and hydrogen gas, as well as a supply inlet and supply outlet for the cooling water are respectively installed on the front wall (of the fuel cell 51). A humidifier 59 including a cabinet that is long along the vehicle width is installed in the vicinity of the upper rear section of the fuel cell 51. A supercharger 58 is installed in diagonally and above, the vicinity of the section on the left side of the humidifier 59, and the section on the left side of the inlet duct 57 extending towards the vehicle width connects to the diagonal lower rear section of the supercharger 58. A back-pressure valve 58c is installed in the vicinity above the section on the left side of the humidifier 59.

The right side of the inlet duct 57b is installed at a position below the Hydrogen cylinder 52. The front end section of the air cleaner case 57a installed the same way, at a position below the Hydrogen cylinder 52 is connected to the right side. An intake duct (not shown in the drawing) is connected to the rear end of the air cleaner case 57a. The air cleaner 57 is mainly made up of the intake duct, air cleaner case 57a, and inlet duct 57b.

A bypass valve 58b is installed in the vicinity below the right rear side of the humidifier 59, and an intercooler 58a is installed in the vicinity diagonally below and rearward of the bypass valve 58b. This bypass valve 58b and the intercooler 58a are installed so as to be positioned between the right side of the inlet duct 57b and the right side of the humidifier 59 along the front and rear of the vehicle. The downstream side of the supercharger 58 connects to the intercooler 58a via the outlet duct not shown in the drawing.

At the left, rear side of the vehicle, the flat silencer 61 along the vehicle width is installed at a position farther to the outer side of the vehicle width than the upper tube 6 on the left side of the vehicle frame. The silencer 61 is formed in a square shape as seen from the side of the frame, and is installed to rise diagonally rearward at the diagonal upper left of the rear wheel 32. The silencer 61 is installed on the rearward half of the exhaust pipe 77 that rises diagonally rearward. A tail pipe 75 is installed protruding rearward on the rear end of the silencer 61 (exhaust pipe 77). An exhaust port 76 for the reacted gas is formed on the rear end of the tail pipe 75.

The radiator 68 is made up of a comparatively small upper-stage radiator 68a positioned to the front of the head pipe 5; and a comparatively large lower-stage radiator 68b positioned frontward of the front side 7a of each down tube 7. A water pump 67 is installed rearward to the right side of the lower-stage radiator 68b; and a thermostat 69 is installed diagonally below and rearward of the water pump 67. Flat batteries 63 are respectively installed towards the frame width on the inner side of the frame cover 42 positioned on both sides of the lower-stage radiator 68b.

A diluter 56 is installed between the bend 7c on each outer tube 7, to protrude downward more than the lower side end of the bottom side 7b. A short exhaust pipe 78 (leading out) from the diluter 56 connects to the front side of bottom side 7b of the down tube 7 on the left side of the frame, and the exhaust pipe 77 is (leads out) positioned from the rear side of the bottom side 7b. In other words, the down tube 7 on the left side of the frame forms a section of the exhaust path for already reacted gas. The exhaust gas from the diluter 56 is therefore discharged to the outer atmosphere via the short exhaust pipe 78, the bottom side 7b of the down tube 7, and the exhaust pipe 77.

Figure 5:
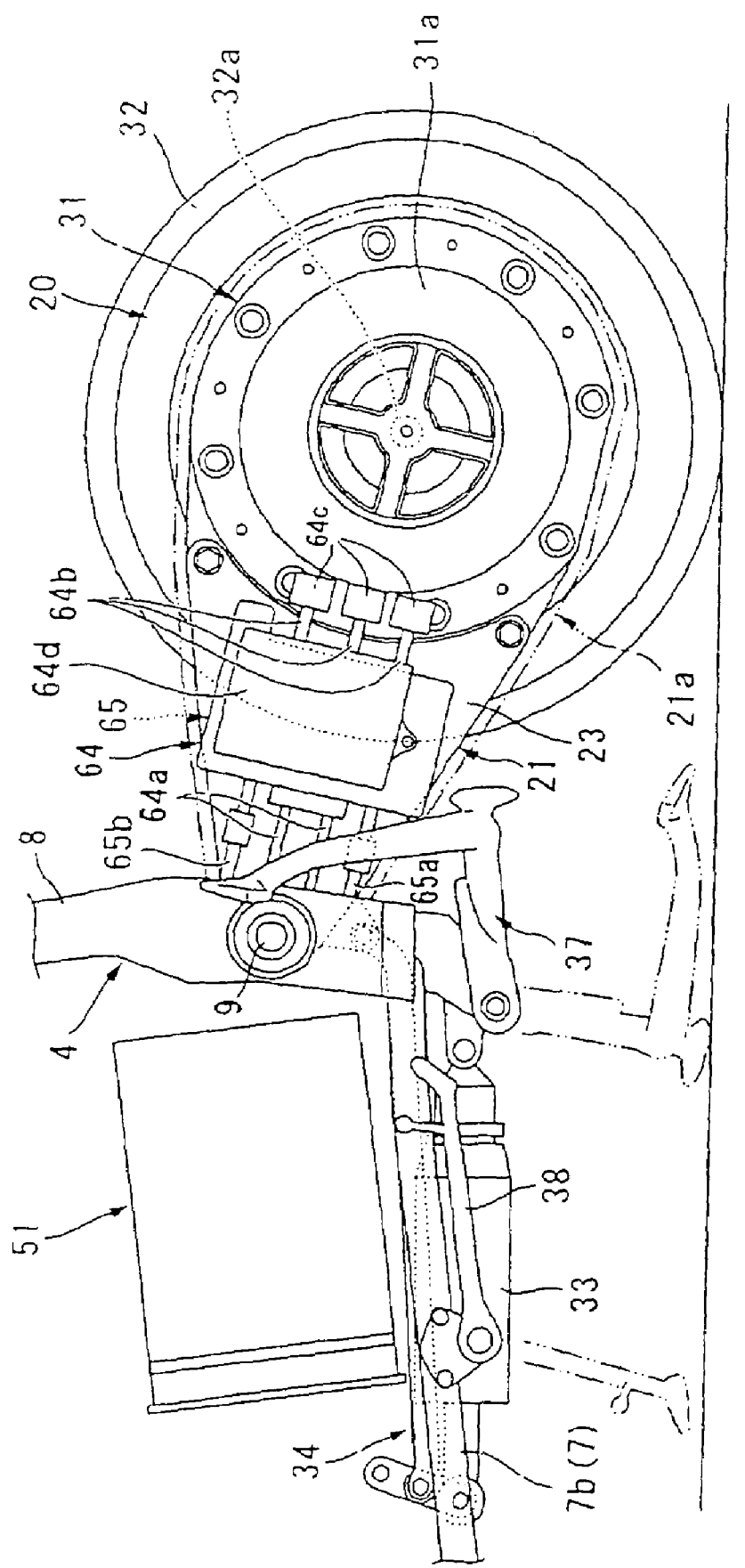
FIG. 5 is an enlarged view of an essential portion of FIG. 1.

The following description is given while referring to FIG. 5. The motor driver 64 forms an approximately square shape as seen from the side of the frame. The motor driver 64 is attached via the cooling plate 65 on the external sides of the vehicle width on the left arm 23 of the rear swing arm 21. A high-voltage cable 64a for supplying power from the fuel cell 51 and the batteries 63 is connected to the front end of the motor driver 64. A water supply pipe 65a and a waste water pipe 65b forming a section of the cooling water path 66 are respectively connected to the front end lower and upper sections of the cooling plate 65.

A three-phase, high-voltage cable 64b come out from the rear end of the motor driver 64, and the high voltage cable 64b with these respective phases connects to the power supply terminal on the front end of the motor 31 positioned immediately to the rear of the motor driver 64. The motor driver 64 in other words, is installed in proximity to the motor 31 as seen from the side of the vehicle frame to an extent where overlap does not occur. The reference numeral 64c in the figure denotes the electrical current sensor 64c for detecting the electrical quantity supplied to the motor 31 where (each phase of) the high-voltage cable 64b is installed. The reference numeral 64d in the figure denotes the voltage smoothing condenser serving as a portion of the motor driver 64.

The arm cover 21a functioning as a portion of the rear swing arm 21 is attached to the motor unit 20. The arm cover 21a covers and protects the rear swing arm 21 and motor 31, as well as the motor driver 64, cooling plate 65, voltage smoothing condenser 64d, high-voltage cables 64a, 64b, water supply pipe 56a and waste water pipe 65b and also the electrical current sensor 64c. Though not shown in the drawing, outer air inlets and outlets are respectively formed internally in the arm cover 21 to allow the flow of outside air.

Figure 6:
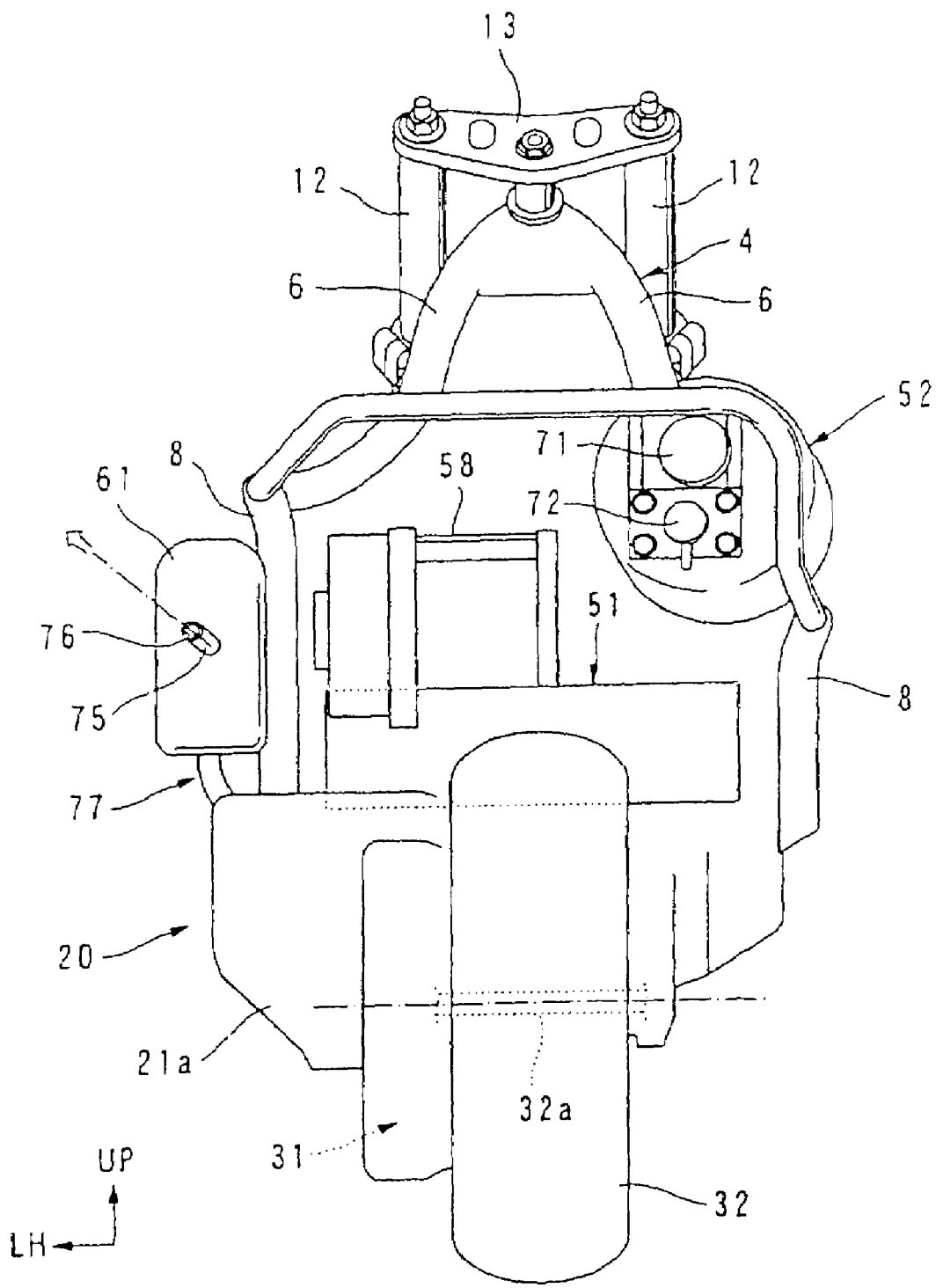
FIG. 6 is a view taken along arrow A of FIG. 1.

As shown in FIGS. 1, 3, and 6, the tail pipe 75 on the rear end of the silencer 61 (exhaust pipe 77) is installed further to the rear than the rear wheel shaft 32a, and at a position higher than the upper edge of the rear wheel 32. The tail pipe 75 is installed diagonally on the rear outer side from the silencer 61 and to protrude diagonally rearward and upward. Therefore the exhaust port 76 on the rear end of the tail pipe 75 is installed with the opening facing the diagonally rearwards and upwards on the rearward, outer side of the frame. Moreover, the silencer 61 (exhaust pipe 77) is installed diagonally to rise towards the rear (in other words, the rear of the exhaust pipe is higher than the front of the exhaust pipe), and installed at a position above the rear wheel 32.

The exhaust structure for a fuel cell vehicle (motorcycle 1) of the embodiment described above, includes a fuel cell 51 for generating electrical power by inducing a reaction between hydrogen and oxygen and, a motor 31 to generate motive power for supply to the rear wheel 32 functioning as the drive wheel based on the electrical power generated by the fuel cell 51 and, an exhaust pipe 77 to convey byproducts in the fuel cell 51 power generation process and, an exhaust port 76 formed in the exhaust pipe 77 opening towards the outer side of the vehicle frame, wherein the exhaust port 76 is positioned more to the rear than the front end of the rear wheel 32, and more specifically, is formed more to the rear than the rear wheel drive shaft 32a.

This structure is capable of reducing the amount of byproducts (for example, water vapor) from the fuel cell 51 emitted along with the reacted gas from the exhaust port 76 that reach the rear wheel 32 even when a side wind blows or the turning radius changes.

In this exhaust structure, installing the exhaust pipe 77 further upward the more it is positioned toward the rear of the rear wheel 32, allows byproducts and reacted gas discharged from the exhaust port 76 to be more easily dispersed by the wind (air pressure) from the moving vehicle. Being so configured, byproducts from the fuel cell 51 are to a greater extent prevented from reaching the rear wheel 32.

Moreover, installing the exhaust pipe 77 upward with respect to the rear wheel 32, allows the byproducts from the fuel cell to be dispersed more easily by wind pressure from driving, etc.

In this exhaust structure, the exhaust port 76 is installed on the side where the side stand 38 is installed on the motorcycle 1. Therefore, byproducts from the fuel cell can easily drain from the exhaust port even in a state where the frame is supported by the side stand 38.

This invention is not limited by the embodiment, and for example may be a structure where the exhaust pipe 77 connects directly from the Diluter 56, and the exhaust gas from the Diluter 56 is emitted only via the exhaust pipe 77 and the silencer 61.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust structure for a fuel cell vehicle having a fuel cell for generating electrical power by inducing a reaction between hydrogen and oxygen, a motor to generate motive power for supplying a drive wheel based on electrical power generated by the fuel cell, and an exhaust pipe for conveying byproducts in the fuel cell power generation process, and an exhaust port formed on an exhaust pipe and opening towards an outer side of a vehicle frame,
   further including:
   a hydrogen cylinder disposed on one of a left or right side of the drive wheel,
   a muffler disposed on the other of the left or right side of the drive wheel, and
   a tail pipe extending from a rear end of the muffler,
   wherein the exhaust port is positioned further in a rear direction than a shaft of the drive wheel.

2. An exhaust structure for a fuel cell vehicle according to claim 1, wherein adjacent to the drive wheel, the exhaust pipe is installed further upwards as a distance in the rear direction increases.

3. An exhaust structure for a fuel cell vehicle according to claim 1, wherein a forward end of the exhaust pipe is connected to a bottom side of a down tube at a location under the fuel cell.

4. An exhaust structure for a fuel cell vehicle according to claim 1, wherein adjacent to the drive wheel, the exhaust pipe slopes upwardly and rearwardly.

5. An exhaust structure for a fuel cell vehicle according to claim 2, wherein the exhaust pipe is installed upward with respect to the drive wheel.

6. An exhaust structure for a fuel cell vehicle according to claim 1, wherein the fuel cell vehicle is a motorcycle including a side stand for supporting the frame that is leaning to one side,
   wherein the exhaust port is formed on a side where the side stand is installed.

7. An exhaust structure for a fuel cell vehicle according to claim 1, wherein the fuel cell vehicle is a motorcycle including:
   a side stand for supporting the vehicle frame when the vehicle is leaning to one side,
   the tail pipe extending further in a direction away from the vehicle as a distance in a rear direction increases, and
   wherein the muffler, the tail pipe, and the exhaust port are formed on a side where the side stand is installed.

8. An exhaust structure for a fuel cell vehicle according to claim 1, wherein the byproducts of the fuel cell power generation process are conveyed from a dilutor to an outer atmosphere via a short exhaust pipe, a bottom side of a down tube, and the exhaust pipe which are connected in series.

9. An exhaust structure for a fuel cell vehicle having a fuel cell for generating electrical power by inducing a reaction between hydrogen and oxygen, a motor to generate motive power for supplying a drive wheel based on electrical power generated by the fuel cell, and an exhaust pipe for conveying byproducts in the fuel cell power generation process, and an exhaust port formed on an exhaust pipe and opening towards an outer side of a vehicle frame,
   further including:
   a wheel-in-motor incorporated into one of a left or right side of the drive wheel,
   a muffler disposed on the same one of the left or right side of the drive wheel, and
   a tail pipe extending from a rear end of the muffler, wherein the exhaust port is positioned further in a rear direction than a shaft of the drive wheel, and opens upwardly and outwardly with respect to a length of the vehicle.

10. An exhaust structure for a fuel cell vehicle according to claim 9, wherein a forward end of the exhaust pipe is connected to a bottom side of a down tube at a location under the fuel cell.

11. An exhaust structure for a fuel cell vehicle according to claim 9, wherein the fuel cell vehicle is a motorcycle including:
a side stand for supporting the frame when the motorcycle is leaning to one side,
the tail pipe extending further in a direction away from a lateral side of the motorcycle as a distance in the rear direction increases so that the byproducts from the power generation process are prevented from reaching the drive wheel, and
wherein the muffler, the tail pipe, and the exhaust port are formed on a side of the motorcycle where the side stand is installed.

12. An exhaust structure for a fuel cell vehicle having a fuel cell for generating electrical power by inducing a reaction between hydrogen and oxygen, a motor to generate motive power for supplying a drive wheel based on electrical power generated by the fuel cell, and an exhaust pipe for conveying byproducts in the fuel cell power generation process, and an exhaust port formed on an exhaust pipe and opening towards an outer side of a vehicle frame,
further including:
a hydrogen cylinder disposed on one of a left or right side of the drive wheel,
a muffler disposed on the other of the left or right side of the drive wheel, and
a tail pipe extending from a rear end of the muffler,
wherein the exhaust port is positioned further in a rear direction than a shaft of the drive wheel, and opens upwardly, rearwardly, and outwardly with respect to a length of the vehicle, and
wherein the exhaust pipe is installed upward with respect to the shaft of the drive wheel.

13. An exhaust structure for a fuel cell vehicle according to claim 12, wherein a forward end of the exhaust pipe is connected to a bottom side of a down tube at a location under the fuel cell.

14. An exhaust structure for a fuel cell vehicle according to claim 12, wherein the fuel cell vehicle is a motorcycle including:
a side stand for supporting the frame when the motorcycle is leaning to one side,
the tail pipe extending further in a direction away from a lateral side of the motorcycle as a distance in the rear direction increases so that the byproducts from the power generation process are prevented from reaching the drive wheel, and
wherein the muffler, the tail pipe, and the exhaust port are formed on a side of the motorcycle where the side stand is installed.

* * * * *